G. B. Keeler,
Windlass.

N° 68,992. Patented Sep. 17, 1867.

Witnesses
Alex F. Roberts
J. A. Service

Inventor
G. B. Keeler
per Munn & Co
Attorneys

UNITED STATES PATENT OFFICE.

G. B. KEELER, OF PORT CHESTER, NEW YORK.

IMPROVEMENT IN HOISTING APPARATUS.

Specification forming part of Letters Patent No. 68,992, dated September 17, 1867.

*To all whom it may concern:*

Be it known that I, G. B. KEELER, of Port Chester, in the county of Westchester and State of New York, have invented a new and useful Improvement in Hoisting Apparatus; and I do hereby declare that the following is a full, clear, and exact description thereof, which will enable others skilled in the art to make and use the same, reference being had to the accompanying drawings, forming part of this specification, in which—

Figure 1:
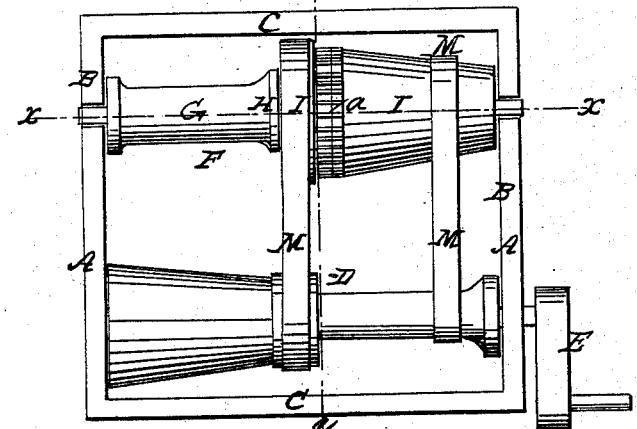
Figure 2:
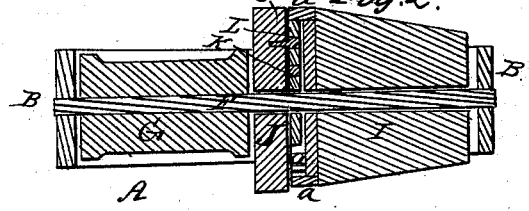
Figure 3:
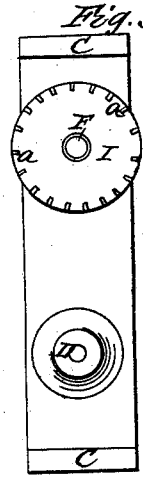

Figure 1 is a plan or top view of my improvements in hoisting apparatus; Fig. 2, a vertical section taken in the plane of the line $xx$, Fig. 1; and Fig. 3, a transverse vertical section taken in the plane of the line $yy$, Fig. 1.

Similar letters of reference indicate corresponding parts.

A in the drawings represents a frame-work, which, in the present instance, is made of a square shape, and consists of parallel side pieces, B, joined together at each end by cross-pieces C; D, a shaft hung in bearings of side pieces, B, across from one to the other of which it is extended. This shaft D, from one-half of its length, is made of a conical or tapering shape, and has at one end a crank, E, applied for convenience in turning it. F, another shaft hung in the side pieces, B, in a line parallel to shaft D. This shaft F, at one portion, has a drum, G, keyed to it, and between its end H and a loose conical-shaped drum, I, is hung a loose pulley or wheel, J. K, a pinion fixed to shaft F at the side of pulley toward the end of conical drum I, and L a pinion hung on pulley to engage with the pinion K, around and on which it revolves. This pinion engages with the pins $a$ at end of drum I. M and N, belts connecting shafts D and E.

Having thus described my invention, what I claim as new, and desire to secure by Letters Patent, is—

The combination of the shafts D and F, having drums, pulleys, and pinions, and constructed substantially as and for the purpose described.

The above specification of my invention signed by me this 24th day of May, 1867.

G. B. KEELER.

Witnesses:
  WM. F. MCNAMARA,
  ALEX. F. ROBERTS.